Oct. 4, 1927. S. SNYDER Re. 16,759

GRAIN CRACKING MACHINE

Original filed Dec. 31, 1924 2 Sheets-Sheet 1

Inventor
Simon Snyder
By Dowell & Dowell
his Attorneys

Oct. 4, 1927.

S. SNYDER

GRAIN CRACKING MACHINE

Re. 16,759

Original Filed Dec. 31, 1924

2 Sheets-Sheet 2

Inventor

Simon Snyder

By Dowell & Dowell his Attorneys

Reissued Oct. 4, 1927. Re. 16,759

UNITED STATES PATENT OFFICE.

SIMON SNYDER, OF MUNCY, PENNSYLVANIA, ASSIGNOR TO SPROUT, WALDRON & CO., OF MUNCY, PENNSYLVANIA, A CORPORATION OF PENNSYLVANIA.

GRAIN-CRACKING MACHINE.

Original No. 1,560,433, dated November 3, 1925, Serial No. 759,077, filed December 31, 1924. Application for reissue filed August 17, 1927. Serial No. 213,713.

This invention relates to grain reducing or cracking machines, and more particularly to machines for cracking corn.

The primary object of my invention is to improve the construction and increase the efficiency of machines of the same general character as the machine shown, having a knife-carrying shaft journaled in bearings in an enclosing casing having knives or cutters protruding therethrough on opposite sides into operative relation to the knives or cutters on the revolving shaft and having a single perforated plate or screen supported underneath the shaft on a frame structure hinged at one side of the casing and detachably secured at the other side thereof, so as to adapt it to swing downwardly upon its hinges into position for removing and replacing the perforated plate or screen.

My invention resides in providing such machines with more screen surface and more space through which the granulated material may pass out or into the lower part of the casing below the shaft, thereby increasing the capacity of the machine and greatly reducing the quantity of meal or undesired product heretofore produced in using machines of the type referred to, and adapting a machine of less size to have greater capacity and to be built at less expense than machines of the same type as heretofore constructed.

The invention will first be hereinafter more particularly described, with reference to the accompanying drawings, which are to be taken as a part of this specification, and then pointed out in the claims at the end of the description.

In said drawings, Fig. 1 is a front view, partly in elevation and partly in section, of a machine embodying my invention;

Figure 1:
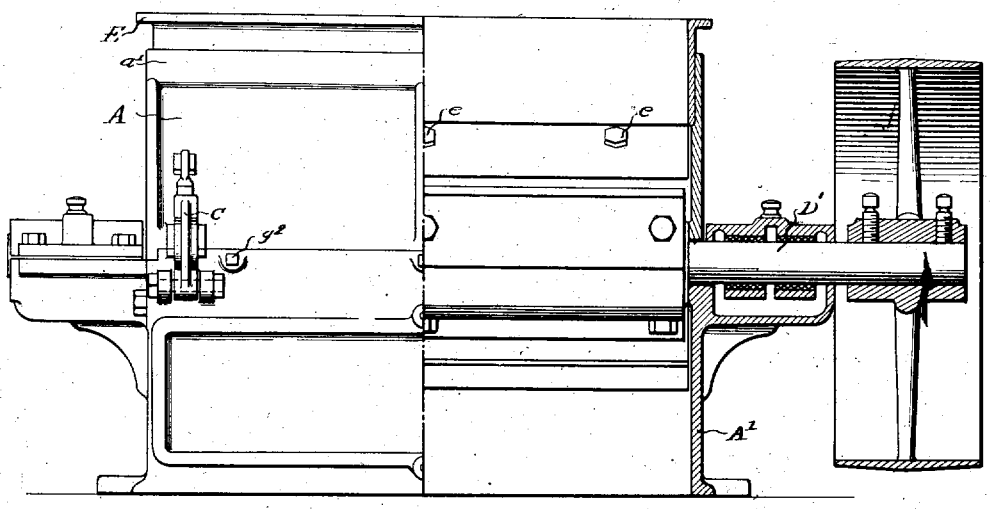
Figure 2:
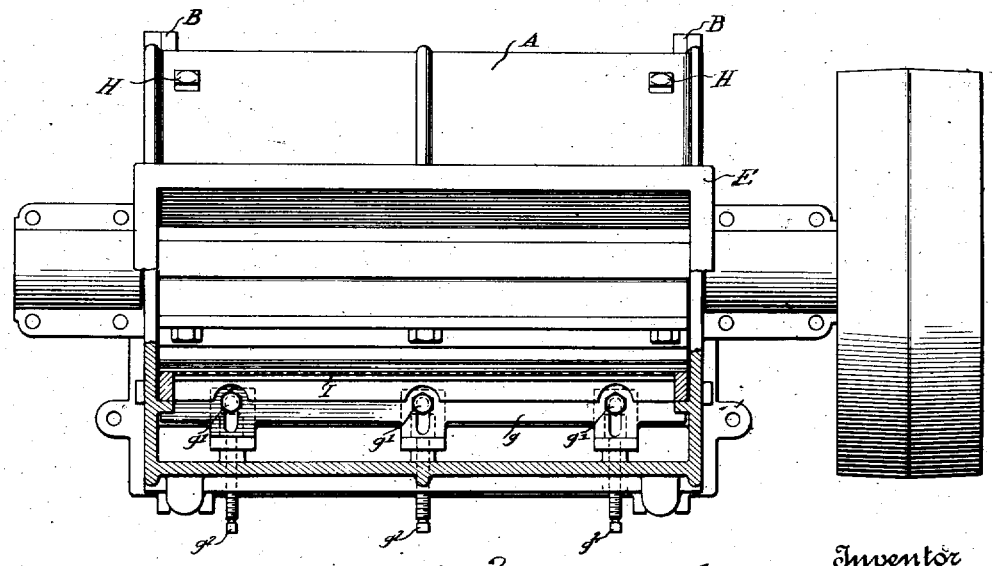
Fig. 2 is a sectional plan view of the same.
Figure 3:
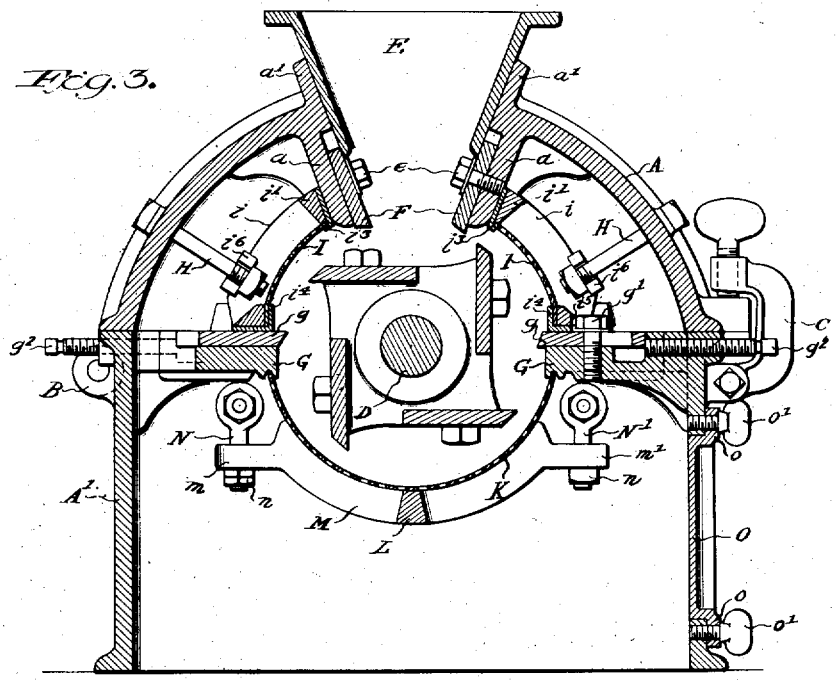
Fig. 3 is a vertical sectional elevation; the section being taken in different planes on opposite sides of the shaft.
Figure 5:
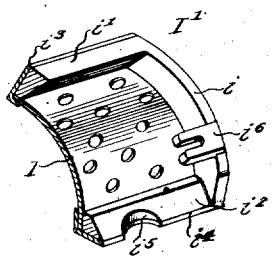
Fig. 5 is a detail perspective view of an end portion of one of the upper screens, showing the screen proper or perforated plate and its supporting frame as an assembled unit.
Figure 4:
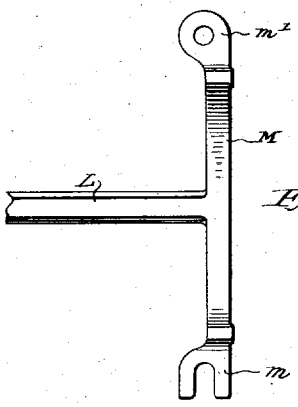
Fig. 4 is a detail view illustrating a broken away end-portion of the hinged support for the lower perforated plate or screen.

Referring to said drawings, in which the same reference characters are used to denote corresponding parts in different views, the letter A denotes an upper casing member of substantially semi-cylindrical-form mounted upon a lower casing member $A^1$, the concave surface of the upper member facing downward and having its lower edges resting upon the upper edges of the lower member. The two members are secured together by a hinged connection B, on one side, and provided on the opposite side with a clamping device C for securing them together, as in machines of the type hereinbefore mentioned, so as to permit the upper member to swing upwardly on its hinges, when the clamping device is released, to afford access to the interior of the casing and parts connected therewith and the knife-carrying shaft D journaled therein. The upper member A of the casing has an oblong opening in its convex top and downwardly inclined flanges *a*, which extend along the margin of said opening on opposite sides thereof, said flanges converging toward their lower ends and each having a knife or cutter F adjustably secured thereto, each of the flanges having a shoulder at its base, so as to form a recess in which the knife is secured, by means of a set screw *e* passing through an oblong slot in the knife and screwed into a threaded hole in the flange, so as to adapt the knife to be adjusted sidewise as its cutting edge wears away. Upwardly and outwardly extending flanges $a^1$ are also preferably provided along the margin of the opening in the casing member A, to support the downwardly inclined converging side walls of a hopper E fitted in said opening with the lower edges of said side walls overlapping the upper edges of the knives F. Extending longitudinally of the casing, at the top of the lower member, on opposite sides thereof, and projecting inwardly therefrom toward the shaft D, are shelf-like supports G each having a knife *g* adjustably secured thereto, preferably by means of set screws $g^1$ passing through oblong slots in the knife and screwed into threaded holes in the underlying support, so as to permit the knife to be adjusted edgewise as its cutting edge wears away. The knives *g* are held firmly in place by means of set screws $g^2$ inserted in threaded openings provided therefor in the knife-supports G, the said screws having their inner ends bearing against the rear edges of the knives while the outer ends of the screws are of polygonal form for attaching thereto a suitable tool for turning the screw so as to move the knife toward the revolving shaft.

It will be observed that the construction of the upper portion of the casing and associated parts provides an enclosed arcuate space or chamber on each side of the knife-carrying shaft extending from the depending flange $a$ to the knife-support G on the same side of the machine, and the inner side of said space is closed by a multi-perforated plate I connecting the lower end of the depending flange with the inner edge of the knife-support on the same side of the machine. The plates I are each secured to and held in place by a frame structure $I^1$ having arcuate end portions $i$ and parallel connecting bars $i^1$ and $i^2$, to which are secured flanged metal plates or angle irons $i^3$ and $i^4$, respectively, on which are seated the upper and lower ends respectively, of the perforated plate I. The depending flange $a$ forms an abutment for the upper end of the frame structure $I^1$, while the lower end thereof is supported upon the underlying knife-support; the flanged plates $i^3$ and $i^4$ being interposed between the ends of the frame structure and the abutment and knife-support, respectively. The lower frame bar $i^2$ and underlying angle iron plate have registering notches, as at $i^5$, to receive the head of the set screw which secures the knife $g$ to its support, and to prevent movement or displacement of the frame structure with perforated plate or screen and attached flanged metal or angle iron end plates, the lower end thereof abuts against lugs $a^2$ on the inside of the casing member A while its upper end abuts against lugs $a^3$ on the inside of said casing member back of the flanges $a$ and a fastening bolt H protruding through a hole in the casing and engaging an open-ended slot in a lug $i^6$ projecting inwardly from the arcuate end portion $i$ of the frame structure $I^1$, serves to draw the frame structure tightly against said abutments or lugs and hold the assembled parts in place. Spanning the space between the knife-supports G on opposite sides of the casing underneath the shaft D, there is a lower curved multi-perforated plate or screen K supported upon a bar L which extends longitudinally of the casing and has a cross-arm M at each end, on which the ends of the perforated plate rest. The cross-arms each have a forked end $m$ and an apertured lug $m^1$ at the other end thereof for connection with eye-bolts N and $N^1$ respectively, suspended from the casing underneath the knife-supports G on opposite sides of the machine. Each eye-bolt has a nut or nuts screwed on its lower end so as to provide rests or supports for the ends of the cross-arm. A hinged connection is thus formed between the casing and cross-arm of the lower screen support at one side of the machine and a detachable connection between the casing and the forked end of the cross-arm at the other side of the machine, so as to permit the forked ends of the cross-arms to be detached to allow the screen support to be lowered upon its hinges, for the purpose of removing the multi-perforated plate and substituting therefor another plate having a greater or less number of holes therein of smaller or larger size, to adapt the machine to produce granulated material of different degrees of fineness, according to the number and size of the holes in the multi-perforated plate. To permit access to the interior of the casing, the lower member thereof is provided on one side with an opening and a detachable closure O for said opening; said closure having marginal offset apertured flanges $o$, through which set screws $o^1$ are inserted and screwed into threaded holes in the casing member. It will be observed that the upper sections of the multi-perforated plates are so housed or covered on the outside and spaced from the casing walls that the granulated product passing therethrough will find a free passage and be directed downwardly inside of the upper casing member through openings in the horizontal knife-supports and caused to pass into the same space that is provided in the lower casing member for the product issuing out of the perforations in the lower multi perforated plate.

A grain reducing or corn cracking machine of the described construction has more screen surface than similar machines as heretofore constructed, having a lower screen only through which the granulated material is discharged underneath the knife-carrying shaft, and owing to the fact that a large per cent of the granulated product is caused to pass through the upper perforated plates or screen sections the capacity of the machine is greatly increased while the amount of meal or undesired product produced in using such machines as heretofore constructed is greatly reduced. A machine of the described construction also requires less power to operate it and since the size of the machine can be reduced, it can be produced at less cost than a larger machine of the same type without the upper screen sections and adjacent arcuate chambers or passages and with only one screen located underneath the cutter-shaft, and the smaller machine will have greater capacity than the larger one as heretofore constructed.

Having thus described my invention, what I claim as new and desire to secure by Letters Patent of the United States is:

1. A grain cracking or reducing machine comprising a casing composed of upper and lower members and having a rotary cutter therein and knives or cutters projecting inwardly from opposite sides thereof in co-operative relation to said rotary cutter; the lower casing member having a curved perforated plate therein arranged below the rotary cutter, and the upper casing member having a feed hopper and receiving chambers on opposite sides thereof into which granulated material is thrown by said rotary cutter and caused to pass by gravity into the lower casing member; said receiving chambers having curved perforated plates spaced from the inner walls of the upper casing member and having openings in the bottoms thereof for the passage of granulated material therethrough.

2. A grain cracking or reducing machine comprising a casing composed of upper and lower members and having a rotary cutter therein and knives or cutters projecting inwardly from opposite sides thereof in co-operative relation to said rotary cutter; the lower casing member having a curved perforated plate therein arranged below the rotary cutter, and the upper casing member having a feed hopper and receiving chambers on opposite sides thereof into which granulated material is thrown by said rotary cutter and caused to pass by gravity into the lower casing member; said receiving chambers having apertured bottoms and the outer and inner walls thereof being formed respectively, by the inner side walls of the casing and curved perforated plates spaced from said inner side walls.

3. A grain cracking or reducing machine comprising a casing composed of upper and lower members and having a rotary cutter therein and knives or cutters projecting inwardly from opposite sides thereof in co-operative relation to said rotary cutter; the lower casing member having a curved perforated plate therein arranged below the rotary cutter, and the upper casing member having a feed hopper and receiving chambers on opposite sides thereof into which granulated material is thrown by said rotary cutter and caused to pass by gravity into the lower casing member; said receiving chambers having apertured bottoms and the outer and inner walls thereof being formed respectively, by the inner side walls of the casing and curved perforated plates spaced from said inner side walls; said perforated plates being removable to permit the substitution of similar plates having perforations therein of different sizes.

4. A grain cracking or reducing machine comprising a casing composed of upper and lower separable members and having a rotary cutter therein and knives or cutters on the inner side thereof projecting inwardly in co-operative relation to said rotary cutter; the upper casing member being of substantially semi-cylindrical form and having a feed hopper thereon and receiving chambers therein on opposite sides thereof into which granulated material is thrown by said rotary cutter and conducted into the lower casing member; said receiving chambers being formed between the inner walls of the casing and detachably secured perforated plates spaced from said walls and having apertured bottoms for the passage of granulated material therethrough; said lower casing member having a perforated plate removably secured therein underneath said rotary cutter.

5. In a machine for cracking or reducing grain, a casing having upper and lower members hinged together on one side and having means on the opposite side thereof for detachably securing them together, the upper casing member being of substantially semi-cylindrical form and having an oblong opening in its convex top provided with marginal depending flanges each having a knife adjustably secured thereto, knife-supports on opposite sides of said casing at the lower end of the upper casing member each having a knife or cutter adjustably secured thereto, a shaft journaled in bearings within said casing between said knife-supports and carrying a plurality of knives, a curved perforated plate connecting said supports underneath said shaft and curved perforated plates on opposite sides of the casing above the shaft having their lower ends supported upon said knife-supports and their upper ends abutting against and supported by said depending flanges; the latter plates being spaced from the inner concave walls of the upper casing member so as to provide arcuate chambers between said walls and the convex surfaces of the plates, and said knife-supports having openings therein for the passage of granulated material to the lower casing member.

6. In a machine of the character described having upper and lower casing members and knives or cutters on opposite sides thereof at the lower end of the upper casing member, a shaft carrying a plurality of knives journaled in bearings in said casing between the knives on the casing, a curved perforated plate underneath said shaft spanning the space between oppositely disposed knives on the casing, a support for said plate consisting of a rod or bar extending lengthwise of the plate about midway thereof underneath its lower convex surface and having cross-arms at each end, each cross-arm having an apertured lug at one end and an open-ended slot at the other end, and means for hinging said cross-arms at one side of the casing and detachably securing them at the other side, said means consisting of eye-bolts suspended within the casing and engaging the apertured lugs on said cross-arms at one side of the casing, and other similarly suspended eye-bolts on the other side of the casing engaging the open-ended slots on the other ends of said cross-arms, whereby the screen support may be lowered upon its hinged connections for the purpose of removing and replacing the screen.

7. In a machine for cracking or reducing grain, a casing having a shaft revolubly mounted therein, carrying a plurality of knives or cutters, said casing having a substantially semi-cylindrical member supported upon a base member with its concave surface facing said base member, the upper member having an oblong opening in its convex top provided with depending marginal flanges, each having a knife or cutter secured thereto, a hopper fitted in said opening above said knives, knife-supports projecting inwardly from opposite sides of the casing toward said shaft, each having a knife or cutter adjustably secured thereto, and perforated metal plates arranged in circular form around said shaft, the lower plate spanning the space between said knife-supports underneath the shaft, and the upper plates connecting the knife-supports with said depending flanges on opposite sides of the upper casing member, whereby a chamber is provided on each side of the casing above the cutter-shaft through which granulated material may pass downwardly into the lower casing member.

8. In a machine for cracking or reducing grain, a casing having a shaft revolubly mounted therein carrying a plurality of knives or cutters, said casing having a substantially semi-cylindrical member supported upon a base member with its concave surface facing said base member, the upper member having an oblong opening in its convex top provided with depending marginal flanges each having a knife or cutter secured thereto, a hopper fitted in said opening above said knives, knife-supports projecting inwardly from opposite sides of the casing toward said shaft, each having a knife or cutter adjustably secured thereto, and perforated metal plates arranged in circular form around said shaft, the lower plate spanning the space between said knife-supports underneath the shaft, and the upper plates connecting the knife-supports with said depending flanges on opposite sides of the upper casing member, whereby a chamber is provided on each side of the casing above the cutter-shaft through which granulated material may pass downwardly into the lower casing member; said perforated plates being removable to permit the substitution of plates with holes of different sizes.

9. In a machine for cracking or reducing grain, a casing having upper and lower separable members; the upper member being of substantially semi-cylindrical form with its concave surface facing the lower member and having a central feed opening in its convex top and downwardly inclined flanges on opposite sides of said opening converging toward their lower ends and each having a knife or cutter adjustably secured thereto, horizontally disposed knives on opposite sides of the casing, a shaft revolubly mounted within the casing and carrying a plurality of knives or cutters, and a sectional screen surface encircling the cutter shaft; said screen surface consisting of a perforated curved metal plate underneath said shaft connecting the supports for said horizontal knives, and perforated curved metal plates arranged on opposite sides of said shaft each connecting the lower end of one of said flanges with the inner end of one of said supports, whereby arcuate chambers are formed on opposite sides of the casing between the inner concave walls thereof and the convex surfaces of the last mentioned plates; said knife supports forming the bottoms of said chambers and having openings therein for the passage of granulated material therethrough.

10. In a machine for cracking or reducing grain, a casing having an upper member of substantially semi-cylindrical form with an oblong opening in its convex top and downwardly inclined knives or cutters adjustably secured thereto along the margin of said opening on opposite sides thereof and converging toward their lower ends, a shaft revolubly mounted within the casing and carrying a plurality of knives or cutters, knife-supports extending horizontally on opposite sides of the casing each having a knife or cutter adjustably secured thereto and projecting toward said shaft, upper perforated curved metal plates connecting said horizontal knife-supports with the lower ends of the supports for said downwardly inclined knives so as to provide arcuate chambers on opposite sides of the casing between the inner concave walls of said upper casing member and the convex surfaces of said perforated plates; said knife supports having openings therein through which granulated material may pass downwardly into the lower casing member, and a lower perforated metal plate connecting said horizontal knife-supports underneath the cutter shaft.

11. In a machine for cracking or reducing grain, a casing having upper and lower members with means for detachably securing them together, the upper casing member being of substantially semi-cylindrical form and having an oblong feed opening in its convex top and provided on opposite sides of said opening with depending flanges converging toward their lower ends and each having a knife adjustably secured thereto, knife-supports extending horizontally on opposite sides of said casing below said upper casing member each having a knife or cutter adjustably secured thereto, a lower curved perforated plate underneath said shaft connecting said horizontal knife-supports, and curved perforated plates detachably secured on opposite sides of the casing above the shaft and having their lower ends supported upon said knife-supports and their upper ends abutting against said depending flanges.

12. In a machine for cracking or reducing grain, a casing having upper and lower members provided with means for detachably securing them together, the upper casing member being of substantially semi-cylindrical form and having an oblong opening in its convex top, a shaft revolubly mounted within the casing and carrying a plurality of knives, knives projecting from the casing toward said shaft horizontally, and substantially vertically disposed knives above the shaft depending from opposite sides of said opening, a lower curved multi-perforated plate underneath said shaft spanning the space between said horizontal knives and curved multi-perforated plates removably secured to and within said upper casing member between said horizontal and vertical knives and forming the inner walls of chambers on opposite sides of the casing through which granulated material is conducted into the lower part of the casing.

13. In a machine of the character described, a casing having an upper member of substantially semi-cylindrical form with knives or cutters projecting inwardly therefrom and having arcuate open spaces or chambers on opposite sides thereof and a rotary cutter therein encircled by a sectional screen consisting of upper perforated curved metal plates forming the inner walls of said arcuate chambers, and a lower perforated curved metal plate underneath the cutter; the bottoms of said chambers having openings therein through which granulated material thrown into said chambers by said cutter is conducted into the lower casing member.

14. In a machine of the character described having upper and lower separable casing members and knives or cutters on opposite sides of the upper casing member, a shaft carrying a plurality of knives arranged in co-operative relation to the knives on the casing, a curved perforated plate underneath said shaft, and a support for said curved plate consisting of a rod or bar extending lengthwise of the plate about midway thereof underneath its lower convex surface and having cross-arms at each end, each cross-arm having an apertured lug at one end and an open-ended slot at the other end, and means for hinging said cross-arms at one side of the casing and detachably securing them at the other side; said means consisting of pivotally suspended eye-bolts engaging the apertured lugs on said cross-arms at one side of the casing, and other similarly suspended eye-bolts on the other side of the casing engaging the open-ended slots on the other ends of said cross-arms.

15. In a machine for cracking or reducing grain, a casing consisting of a substantially semi-cylindrical member having knives projecting inwardly therefrom and supported upon a base member with its concave knife-carrying surface facing said base member, a shaft revolubly mounted in said casing and carrying a plurality of knives or cutters, the upper casing member having an oblong feed opening in its convex top and provided with depending marginal flanges on opposite sides of said opening, shelf-like knife-supports projecting inwardly from opposite sides of the casing toward said shaft, each having a knife or cutter secured thereto and openings therein through which granulated material may fall into the lower casing member, and curved perforated metal plates arranged in circular form around said shaft; the lower perforated plate spanning the space between said knife-supports underneath the shaft, and the upper perforated plates connecting said knife-supports with said depending flanges so as to provide an arcuate space or chamber on each side of the casing above the cutter shaft between the perforated plate and the inner wall of the casing.

16. In a machine of the character described, a casing having an upper member of substantially semi-cylindrical form with a plurality of knives or cutters on each side thereof projecting inwardly therefrom at different angles, and having arcuate open spaces or chambers on opposite sides thereof, a rotary cutter journaled in said casing, a sectional screen extending around said rotary cutter and consisting of upper perforated curved metal plates forming the inner walls of said arcuate chambers and a lower perforated curved metal plate underneath the cutter, and knife supports forming the bottoms of said chambers and having openings therein through which granulated material is conducted into the lower casing member.

17. A grain cracking or reducing machine comprising a casing having a feed hopper thereon, rotary knives arranged within the casing below said hopper, stationary knives arranged in co-operative relation to the rotary knives, and a screen surface which extends across an open space below the rotary knives and upwardly around the rotary knives; that portion of said screen surface which extends above the rotary knives being spaced from the upper part of the casing so that suitable spaces are provided above and below the rotary knives to receive granulated material which is caused to pass into the lower part of the casing.

18. A grain cracking or reducing machine comprising a casing, rotary knives arranged within the casing, stationary knives arranged in co-operative relation to the rotary knives, a feed hopper arranged above the rotary knives, a curved perforated plate or screen extending across an open space below the rotary knives through which granulated material passes into the lower part of the casing, and perforated plates or screens in the upper part of the casing and spaced therefrom so as to provide suitable spaces above the rotary knives into which granulated material is thrown and caused to pass into said lower part of the casing.

19. A grain cracking or reducing machine comprising a casing having a feed hopper mounted thereon and a shaft journaled therein carrying rotary knives, stationary knives arranged in co-operative relation to the rotary knives, and a screen surface substantially encircling the rotary knives; said screen surface including curved perforated plates or screens which extend across an open space below the rotary knives and above the same; that portion of said screen surface which extends above the rotary knives being spaced from the upper part of the casing so that suitable spaces are provided above and below the rotary knives to receive granulated material which gravitates into the lower part of the casing.

In testimony whereof, I have signed my name to this specification.

SIMON SNYDER.